Sept. 21, 1926.  N. D. FAIRBANKS  1,600,756
SNARE
Filed Oct. 17, 1925
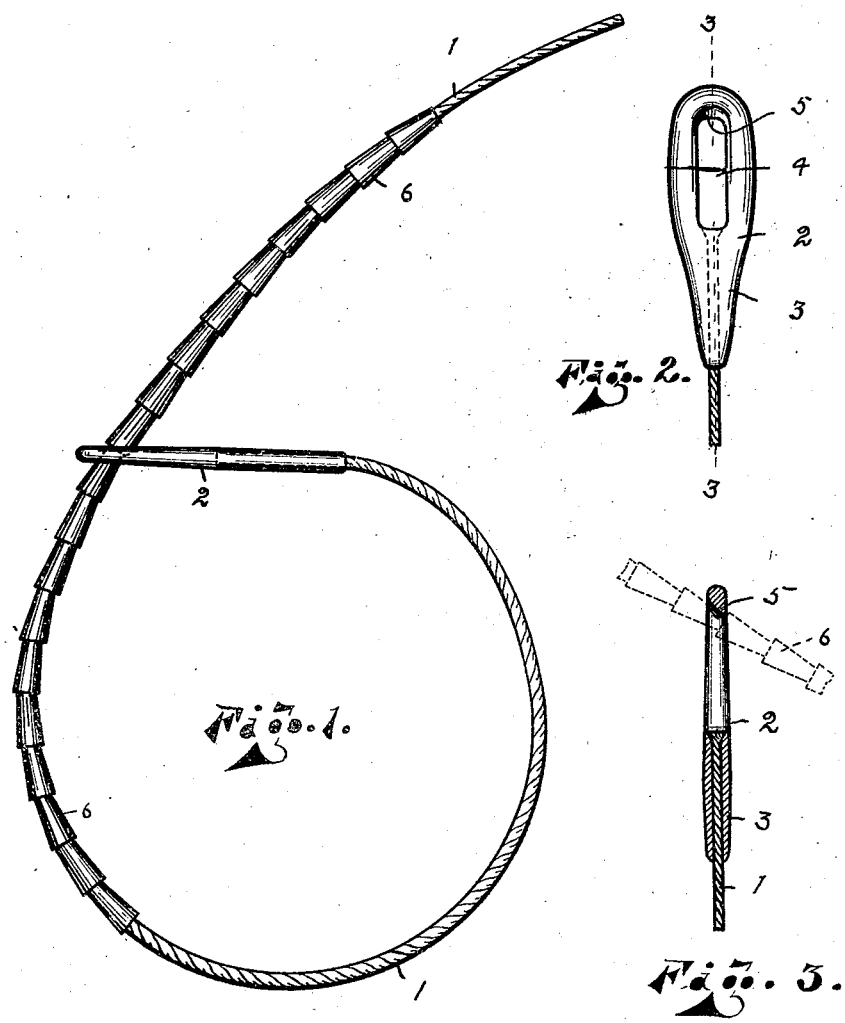

Patented Sept. 21, 1926.

1,600,756

UNITED STATES PATENT OFFICE.

NORMAN D. FAIRBANKS, OF HIBBING, MINNESOTA.

SNARE.

Application filed October 17, 1925. Serial No. 63,039.

This invention relates to animal traps and has special reference to a novel form of snare; the principal object being to provide simple, positive and effective means for strangling an animal caught in the snare quickly thereafter.

Other objects and advantages of the novel structure will appear in the further description of the invention.

In the accompanying drawing forming part of this application in which like reference characters designate like parts:

Figure 1 is a side elevation of one of the improved snares made of twisted flexible wire;

Figure 2 is a front elevation of the extreme noose end of the wire; and

Figure 3 is an enlarged vertical sectional view on the line 3—3, Figure 2.

For animals such as wolves, foxes, or the like, I prefer to use a flexible, twisted wire of sufficient strength, the same being illustrated at 1 in the accompanying drawings. The extreme noose end of the wire is provided with an elongated metal socket member 2, which member is provided with a tapered shank 3 made sufficiently large to provide for varying sized wires so that a hole may be drilled therethrough to accommodate the wire, whether it be of the size illustrated or slightly larger or smaller. The opening 4 in the socket is elongated horizontally thereof and provided in its outer extremity with an inwardly projecting sharpened lip 5, the biting edge of which occurs upon one side thereof and is designed to catch behind any one of the shoulders formed by the ferrules indicated at 6. These ferrules 6 are threaded upon the wire 1 somewhat remote from the loop and the terminal ferrules are soldered or brazed to the wire, while the intermediate ones are loosely mounted thereupon, thus permitting of free flexibility of the wire therein, so that as the bight or noose of the snare is pulled taut, as for example about the neck of the animal, the loop 2 will readily slip down onto the ferrules readily catching behind the shoulder of the closest one to the animal and retaining its hold, as is obvious.

The ferrules 6 are of metal and substantially the size as shown in the drawing for the ordinary snare, and while their construction as well as that of the loop may be considerably varied without departing from the spirit of the invention, it is obvious that the illustration is sufficient for one practical embodiment thereof.

Having thus described my invention, what I claim and desire to secure by Letters Patent, is:

1. A snare of the character described made of flexible wire including a noose having a socket in the terminal end thereof, a plurality of tapered ferrules loosely strung upon the wire adjacent each other except as to the extreme end ones which are rigidly attached thereto, said series of ferrules cooperatively engageable through the socket and normally passing therethrough in but one direction.

2. A snare comprising in combination a flexible wire, a noose formed upon one end thereof having a socket surrounding the body portion of the wire, a catch within said socket, and a plurality of catch engaging units upon the wire for payment through the socket normally in but one direction.

In testimony whereof I hereunto affix my signature.

NORMAN D. FAIRBANKS.